A. Goodrich,
Stump Elevator.

Nº 78,450.        Patented June 2, 1868.

Witnesses:
Theo Tusche
Wm Trewin

Inventor:
A. Goodrich
Per Munn & Co
Attorneys

United States Patent Office.

ALFRED GOODRICH, OF BURNT PRAIRIE, ILLINOIS.

Letters Patent No 78,450, dated June 2, 1868.

IMPROVEMENT IN STUMP-EXTRACTOR.

*The Schedule referred to in these Letters Patent and making part of the same.*

TO ALL WHOM IT MAY CONCERN:

Be it known that I, ALFRED GOODRICH, of Burnt Prairie, in the county of White, and State of Illinois, have invented a new and improved Stump-Extractor; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
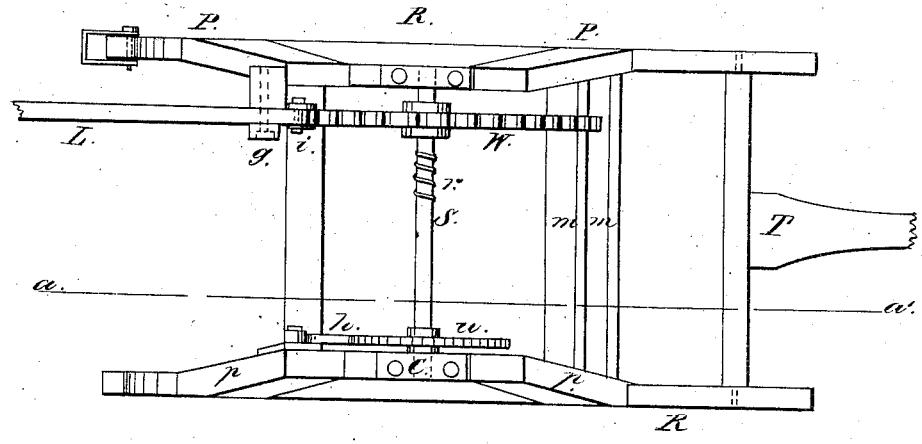
Figure 1 is a top view of the machine.
Figure 2:
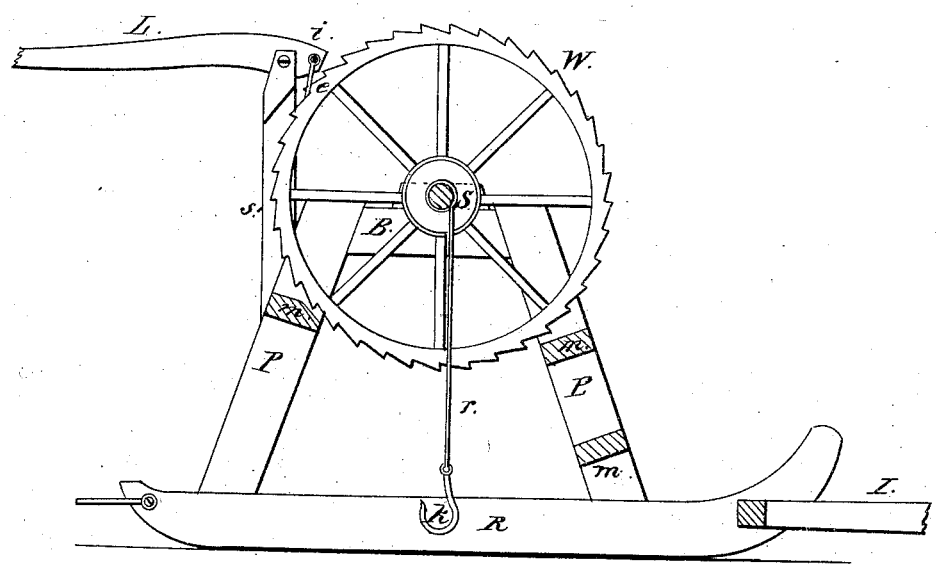
Figure 2 is a section through the line $a\ a'$, fig. 1.

This improvement consists in placing the extracting-machinery upon runners, and so arranging the said machinery that it shall be easily operated, simple in construction, and capable of developing much power for the purpose intended.

Upon the runners R is placed a pyramidal frame, consisting of the stanchions P and the cross-pieces B and braces M. The frame is securely attached to the runners by mortises, tenons, and pins.

A tongue, T, is attached in the ordinary manner. Upon the cross-pieces B are pillow-blocks $c$, bolted firmly thereon, into which a shaft, S, works.

Just inside the cross-pieces are two wheels, and the unoccupied space between them serves as a drum, upon which is wound a rope or chain, $r$, by which the stump to be extracted is connected with the machine, the rope $r$ being passed around it in the usual manner.

One of the said wheels is provided with strong ratchet-teeth on its periphery, and of the same width as the rim of the wheel. This serrated or ratchet shape of the said teeth is for the purpose of more perfectly catching into a link, $i$, to be hereinafter explained. The other wheel $u$ is of less diameter than the wheel $w$, and is also provided with ratchet-teeth on its periphery, for a purpose to be explained.

Both wheels are firmly keyed on to the shaft S. A pawl, $h$, attached to one of the stanchions, catches into the teeth of the small wheel $u$ in the manner common to pawls. A vertical stanchion, $s'$, is bolted into the stanchion opposite the pawl. This vertical stanchion serves as a fulcrum for the lever L, which works in a slot cut in the top of the said stanchion, and is held loosely there by a through-bolt, $g$.

The long arm of the lever extends to the rear of the machine, and is so bent as to be easily worked by the attendant, when standing on the ground behind the runners. The short arm of the lever is provided with a strong iron link, $i$, hanging vertically, and always in juxtaposition with any one of the ratchet-teeth on the lever-wheel $w$.

In operating this machine, the rope $r$ is unwound from the drum, and, by means of its hook $k$, is secured to this stump and its roots. The attendant raises the lever L, and the link $i$ slips downward on the top face of the nearest tooth, and catches under its vertical face.

This action of the link in catching under the teeth is due to the endeavor of the link, actuated by the force of gravity, to assume a perpendicular position.

The lever is then depressed, and the link turns the lever-wheel a short distance. The pawl $h$ catches into the teeth of the ratchet-wheel $u$, and retains the strain on the rope and stump, while the lever is again lifted, for the link $i$ to catch another tooth on the lever-wheel $w$. This operation is continued till the stump is extracted.

If the ground in the vicinity of the stump is soft and yielding, the excellence of this stump-extractor will be amply appreciated, for, by placing two stout pieces of plank crosswise underneath the runners, the most miry ground around stumps will be able to sustain the machine when exerting its extracting tension.

This machine is constructed of wood, as to its runners and general frame, and securely bolted in the common manner. The lever and ratchet-wheels are of iron, and the shaft upon which they work, in practice should be of wrought iron.

This machine can be used with advantage for moving heavy timber-logs, when there is snow on the ground, and answers the purpose of a sling-cart for such uses, as, by backing the runners over the end of the log, and securing the same with the rope or chain, the end can be raised, and the log drawn along by a team hitched to the tongue T.

The lever-wheel $w$ may be constructed of wood and cast metal combined.

The advantages claimed for this machine are, first, its cheapness and simplicity of construction; second, the ease with which it can be operated; third, the small number of its parts, which permits the machine to be compactly constructed; fourth, its strength as a whole, rendering it unlikely to get out of repair, the combination of which above-named qualities renders it a durable and desirable machine for all persons needing the same.

Having thus described my invention, what I claim as new, and desire to secure by Letters Patent, is—

The construction and arrangement of the pyramidal frame P upon the runners R, shaft S, ratchet-wheels $u$ $w$, of unequal diameters, pawl $h$, standard S', pivoted lever L, and link $i$, as herein described, for the purpose specified.

ALFRED GOODRICH.

Witnesses:
 JAMES FOSTER,
 PETER J. FILES.